US011354679B1

(12) United States Patent
Morgan et al.

(10) Patent No.: US 11,354,679 B1
(45) Date of Patent: Jun. 7, 2022

(54) ACCOUNT VALIDATION SYSTEM AND RELATED METHODS

(71) Applicant: Inmar Clearing, Inc., Winston-Salem, NC (US)

(72) Inventors: Rex Morgan, Greensboro, NC (US); Jacob Bowman, High Point, NC (US); Jason Eudy, Pinnacle, NC (US); Ashley Merrill, Lewisville, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 182 days.

(21) Appl. No.: 16/428,211

(22) Filed: May 31, 2019

(51) Int. Cl.
G06Q 30/00 (2012.01)
G06Q 30/02 (2012.01)

(52) U.S. Cl.
CPC ..... *G06Q 30/0185* (2013.01); *G06Q 30/0283* (2013.01)

(58) Field of Classification Search
CPC ........... G06Q 30/0185; G06Q 30/0283; G06Q 20/40; G06Q 20/4014; G06Q 20/4016; G06Q 30/0255; G06Q 20/20; G06F 21/31; G06F 2221/2103; G06F 2221/2133
USPC ....................................................... 705/318
See application file for complete search history.

(56) References Cited

U.S. PATENT DOCUMENTS

| | | | | | |
|---|---|---|---|---|---|
| 8,732,089 | B1 * | 5/2014 | Fang | ....................... | H04L 63/08 705/67 |
| 9,813,402 | B1 * | 11/2017 | Chen | ..................... | G06F 21/316 |
| 10,607,116 | B1 * | 3/2020 | Omer | ................... | G07G 1/0063 |
| 10,856,807 | B2 * | 12/2020 | Fitzpatrick | ........... | A61B 5/4866 |
| 2005/0216768 | A1 * | 9/2005 | Eppert | ............... | G06Q 20/4014 726/5 |
| 2006/0036857 | A1 * | 2/2006 | Hwang | ................... | G06F 21/31 713/168 |
| 2008/0201578 | A1 * | 8/2008 | Drake | ..................... | G06F 21/36 713/172 |

(Continued)

OTHER PUBLICATIONS

A. Al-Qayedi, W. Adi, A. Zahro and A. Mabrouk, "Combined Web/mobile authentication for secure Web access control," 2004 IEEE Wireless Communications and Networking Conference (IEEE Cat. No. 04TH8733), Atlanta, GA, USA, 2004, pp. 677-681 vol. 2, doi: 10.1109/WCNC.2004.1311267. (Year: 2004).*

*Primary Examiner* — Sarah M Monfeldt
*Assistant Examiner* — John S. Wasaff
(74) *Attorney, Agent, or Firm* — Allen, Dyer, Doppelt + Gilchrist, P.A. Attorneys at Law

(57) ABSTRACT

An account validation system may include an account validation server. The server may store an order purchase history for accounts. The order purchase history may include a purchased product. The server may obtain an account identifier from a user device for a given user and communicate the purchased product to the user device for display thereon based upon a corresponding account associated with the account identifier. The server may communicate a fake product that is inconsistent with the order purchase history to the user device and based upon the order purchase history for the corresponding account. The server may also cooperate to prompt the given user to differentiate the purchased product from the fake product, and determine, based upon the user device, whether the given user has differentiated the purchased product from the fake product, and when so, validate the corresponding account.

21 Claims, 5 Drawing Sheets

(56) References Cited

U.S. PATENT DOCUMENTS

| | | | |
|---|---|---|---|
| 2009/0106134 A1* | 4/2009 | Royyuru | G06Q 40/00 |
| | | | 705/35 |
| 2009/0276839 A1* | 11/2009 | Peneder | G06F 21/31 |
| | | | 726/8 |
| 2010/0114776 A1* | 5/2010 | Weller | H04L 9/3213 |
| | | | 705/44 |
| 2011/0087530 A1* | 4/2011 | Fordyce, III | G06Q 30/0215 |
| | | | 705/14.17 |
| 2012/0054834 A1* | 3/2012 | King | G06F 21/31 |
| | | | 726/4 |
| 2012/0101881 A1 | 4/2012 | Taylor et al. | |
| 2013/0036459 A1* | 2/2013 | Liberman | H04L 63/102 |
| | | | 726/6 |
| 2013/0144786 A1* | 6/2013 | Tong | G06Q 20/4016 |
| | | | 705/44 |
| 2014/0317689 A1* | 10/2014 | Mogush | H04L 63/126 |
| | | | 726/4 |
| 2016/0063503 A1* | 3/2016 | Kobres | H04L 63/102 |
| | | | 705/18 |
| 2016/0132673 A1* | 5/2016 | Birk | G06F 21/30 |
| | | | 726/19 |
| 2016/0262017 A1* | 9/2016 | Lavee | H04L 63/083 |
| 2017/0078262 A1* | 3/2017 | Riddick | G06F 21/31 |
| 2017/0109509 A1* | 4/2017 | Baghdasaryan | G06F 21/32 |
| 2018/0352430 A1* | 12/2018 | Mansour | H04L 63/083 |
| 2019/0197543 A1* | 6/2019 | Gupta | G06Q 30/0601 |
| 2019/0325498 A1* | 10/2019 | Clark | G06K 7/1417 |
| 2019/0377853 A1* | 12/2019 | Obaidi | G06N 20/00 |
| 2020/0110866 A1* | 4/2020 | Greenberger | G06Q 30/0255 |

* cited by examiner

ACCOUNT VALIDATION SYSTEM AND RELATED METHODS

TECHNICAL FIELD

The present invention relates to the field validation and more particularly, to account validation and related methods.

BACKGROUND

An account is typically associated with or owned and operated by a given user. The account may be used with a particular retailer or store, either or both of online or in-store, for example, to execute and track purchases. An account may be accessed by way of a username and password. An account may be validated, for example, to confirm ownership of the account.

Sales of a particular product or service may be based upon how well that product or service is marketed to a consumer. One form of marketing is called a loyalty program.

A loyalty program, from the perspective of a merchant or retailer, encourages a customer to continue to purchase the products and/or services of the retailer associated with the loyalty program. A loyalty program typically rewards the customer or user with discounts, promotions, or other benefits, which may be used toward the purchase of future products or services. A loyalty program may also permit the customer to obtain cash back or redeem points for products or services that may be provided by the retailer or another retailer, typically one that provides unrelated products or services.

SUMMARY

An account validation system may include a user device and an account validation server. The account validation server may be configured to store an order purchase history for each of a plurality of accounts. The order purchase history may include at least one purchased product. The account validation server may also be configured to obtain an account identifier from the user device for a given user and communicate the at least one purchased product to the user device for display thereon based upon a corresponding account associated with the account identifier. The account validation server may also be configured to communicate at least one fake product to the user device for display thereon and based upon the order purchase history for the corresponding account, the at least one fake product being inconsistent with the order purchase history of the user. The account validation server may also be configured to cooperate with the user device to prompt the given user to differentiate the at least one purchased product from the at least one fake product, and determine, based upon the user device, whether the given user has differentiated the at least one purchased product from the at least one fake product, and when so, validate the corresponding account.

The account validation server may be configured to store the order purchase history for each of a plurality of loyalty accounts, obtain a loyalty account identifier from the user device for the given user, and communicate the at least one purchased product to the user device for display thereon based upon a corresponding loyalty account associated with the loyalty account identifier. The account validation server may be configured to generate the at least one fake product based upon machine learning. The account validation server may be configured to learn a brand preference for a given type of product and generate the at least one fake product based upon the brand preference, for example.

The account validation server may be configured to learn a price preference for a given type of product and generate the at least one fake product based upon the price preference. The account validation server may be configured to learn a dietary preference for a given type of product and generate the at least one fake product based upon the dietary preference, for example. The account validation server may be configured to learn a food type preference and generate the at least one fake product based upon the food type preference, for example.

The user device may be configured to display images of the at least one purchased product and the at least one fake product. The account validation server may be configured to cooperate with the user device to prompt the given user to differentiate the at least one purchased product from the at least one fake product by prompting the given user to select the at least one purchased product, for example. The account validation server may be configured to cooperate with the user device to prompt the given user to differentiate the at least one purchased product from the at least one fake product by prompting the given user to select the at least one fake product.

The account identifier may include one of an account number, an email address, and a name of the given user, for example. The at least one purchased product may include a plurality of purchased products. The at least one fake product may include a plurality of fake products.

A method aspect is directed to a method of validating an account. The method may include using an account validation server to store an order purchase history for each of a plurality of accounts. The order purchase history may include at least one purchased product and obtain an account identifier from a user device for a given user. The method may also include using the account validation server to communicate the at least one purchased product to the user device for display thereon based upon a corresponding account associated with the account identifier and communicate at least one fake product to the user device for display thereon and based upon the order purchase history for the corresponding account, the at least one fake product being inconsistent with the order purchase history of the user. The method may further include using the account validation server to cooperate with the user device to prompt the given user to differentiate the at least one purchased product from the at least one fake product and determine, based upon the user device, whether the given user has differentiated the at least one purchased product from the at least one fake product, and when so, validate the corresponding account.

A computer readable medium aspect is directed to a non-transitory computer readable medium for validating an account. The non-transitory computer readable medium includes computer executable instruction for causing a processor to perform operations. The operations may include storing an order purchase history for each of a plurality of accounts, wherein order purchase history may include at least one purchased product, and obtaining an account identifier from the user device for a given user. The operations may also include communicating the at least one purchased product to the user device for display thereon based upon a corresponding account associated with the account identifier and communicating at least one fake product to the user device for display thereon and based upon the order purchase history for the corresponding account, the at least one fake product being inconsistent with the order purchase history of the user. The operations may further include cooperating with the user device to prompt the given user to differentiate the at least one purchased product from the at least one fake product, and determining, based upon the user device, whether the given user has differentiated the at least one purchased product from the at least one fake product, and when so, validate the corresponding account.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
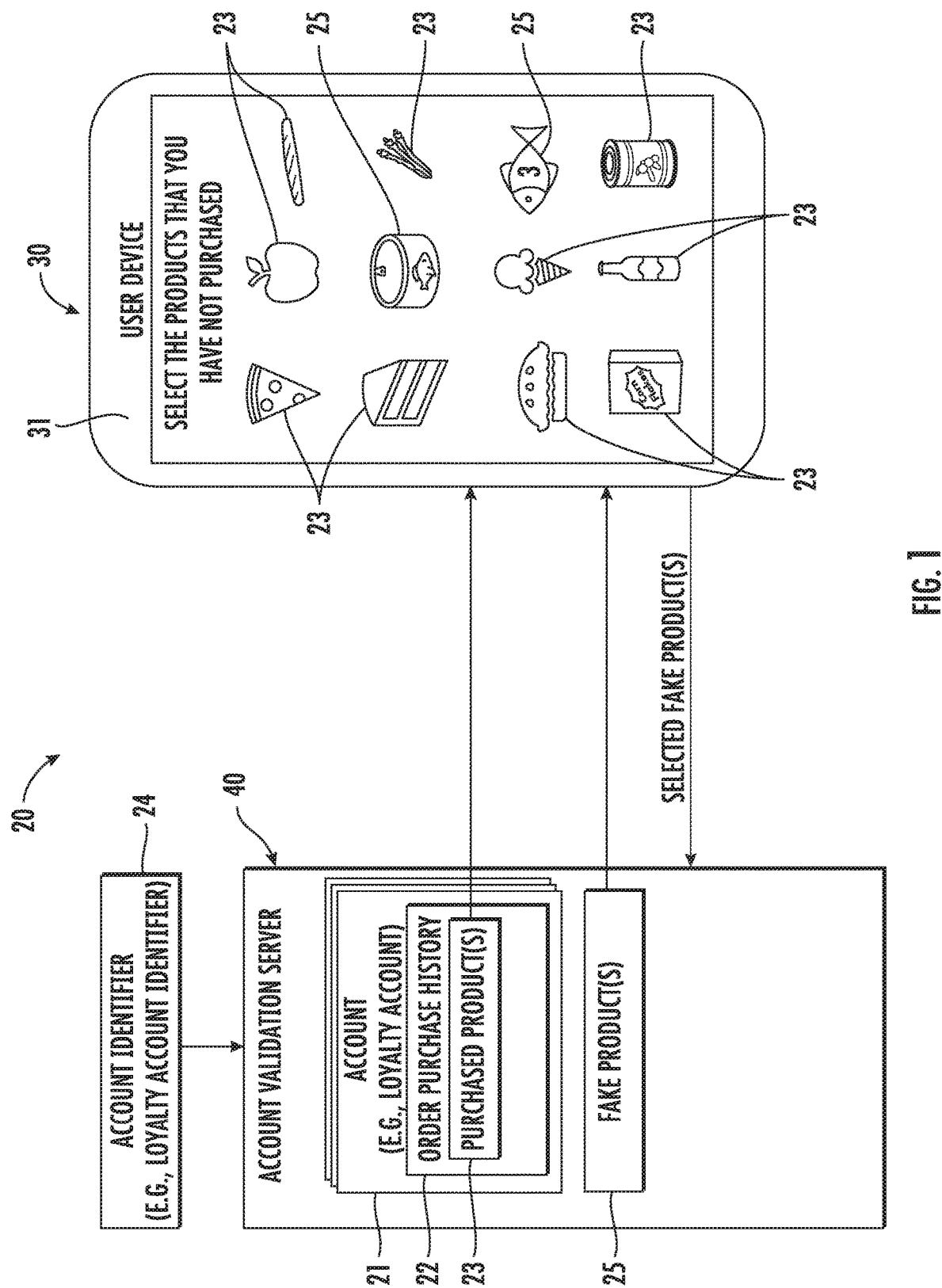
FIG. 1 is a schematic diagram of an account validation system of FIG. 1.
Figure 2:
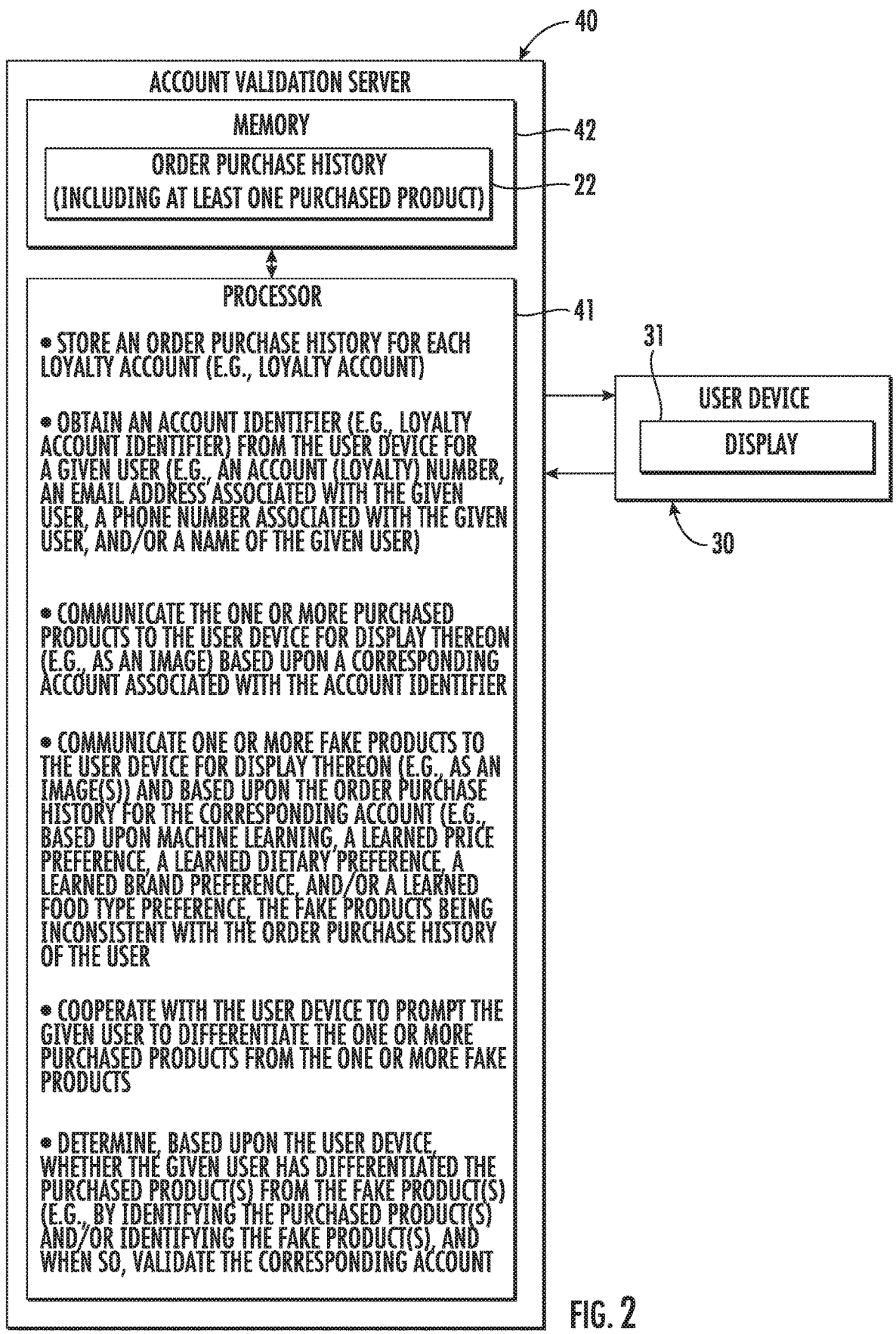
FIG. 2 is a schematic block diagram of the account validation system of FIG. 1.

Referring initially to FIGS. 1 and 2, an account validation system 20 includes a user device 30 and an account validation server 40. The user device 30 may be a tablet computer, personal computer, mobile device, wearable device, or any other wired or wireless electronic device associated with the user. The user device 30 includes a display 31.

The account validation server 40 includes a processor 41 and a memory 42 coupled to the processor. While operations of the account validation server 40 are described herein, it should be understood that the processor 41 and the memory 42 cooperate to perform the described operations.

Figure 3:
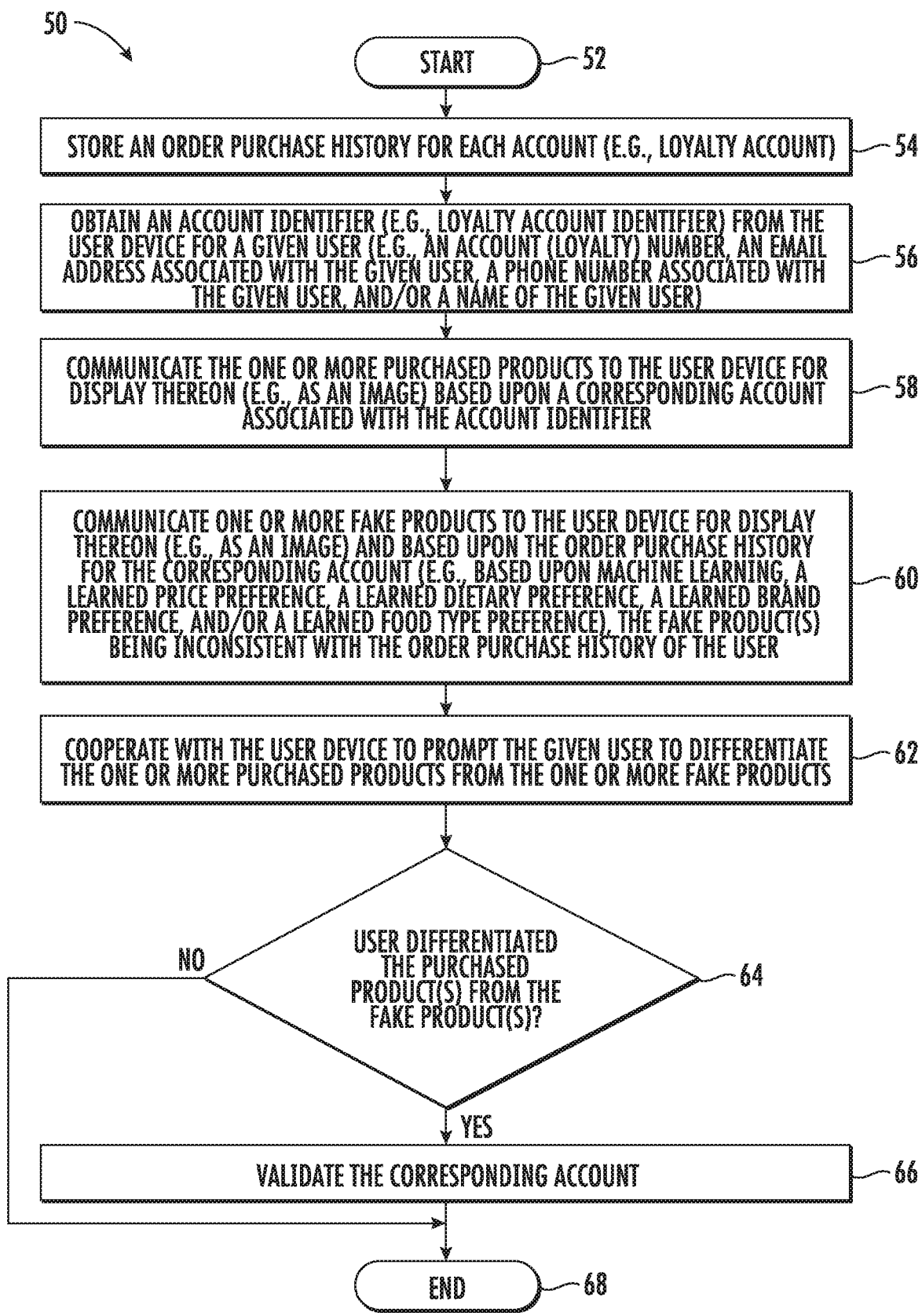
FIG. 3 is a flow chart of operation of the account validation system of FIG. 2.

Referring now additionally to the flowchart 50 in FIG. 3, beginning at Block 52, an account verification will now be described with respect to operations of the account verification server 40. At Block 54, an order purchase history 22 for accounts 21 is stored, for example, in the memory 42. Each account 21 may be associated with a given user and have an account identifier 24, for example, an account number, an email address associated with the given user, a phone number associated with the given user, and/or a name of the given user.

The order purchase history 22 includes one or more purchased products 23. Purchased products 23 may include information, such as, for example, product identifier (e.g. SKU or PLU) and/or product description, and the order purchase history 22 may include information, such as, purchase price, purchase date, purchase quantity, etc.

At Block 56, an account identifier 24 from the user device 30 for a given user is obtained. The account identifier 24 may be obtained by manual entry, for example, via an input device or touch screen of the user device 30. The account identifier 24 may be communicated from the user device 30 to the account verification server 40. Alternatively, the account verification server 40 may retrieve the account identifier 24 from the user device 30. In some embodiments, the account identifier 24 may be wirelessly exchanged between the user device 30 and the account verification server 40, for example, using near field communication (NFC), Bluetooth, or other wireless protocol. The account identifier 24 may be an account number, an email address associated with the given user, a phone number associated with the given user, and/or a name of the given user.

The account verification server 40, at Block 58, communicates the purchased product or products 23 to the user device 30 for display thereon the display 31 based upon a corresponding account 21 associated with the account identifier 24. In other words, the account verification server 40 communicates one or more of the products from the order purchase history 22 for the given user to the user device 30. The user device 30 may display the purchased products as corresponding text or corresponding images 32 of the purchased product, for example.

The account verification server 40, at Block 60, communicates one or more fake products 25 to the user device 30 for display thereon the display 31. The fake products 25 are products that are inconsistent with the order purchase history 22 of the user. The fake products 25 are based upon the order purchase history 22 for the corresponding account 21. More particularly, the account verification server 40 may generate the fake 25 based upon machine learning. The account verification server 40 may learn information representative of the buying patterns associated with the given user. More particularly, the account validation server 40 may learn a brand preference for a given type of product and generate the fake products 25 based upon the brand preference (e.g., the given user typically prefers a generic brand of staple items, such as milk, eggs, butter, but prefers name brands for other items). The account validation server 40 may alternatively or additionally learn a price preference for a given type of product and generate the fake products 25 based upon the price preference (e.g., the given user typically purchases or prefers certain products when they are on a promotion or have a price below a threshold). The account validation server 40 may learn a dietary preference for a given type of product and generate the fake products 25 based upon the dietary preference (e.g., the given user may purchase gluten free products or sugar free products).

Still further, the account validation server 40 may alternatively or additionally learn a food type preference and generate the fake products 25 based upon the food type preference (e.g., reduced fat products, or healthier products, such as skim milk or whole wheat bread, cookies over donuts, etc.). Of course, other parameters or classification characteristics of the purchased products 23 may be used to train the machine learning model for the generation of the fake products 25. As will be appreciated by those skilled in the art, the account validation server 40 may not generate staple products as fake items, as these products are typically and frequently purchased by all users. The user device 30 may display the fake products 25 as corresponding text or corresponding images 34 of an associated product.

At Block 62, the account validation server 40 cooperates with the user device 30 to prompt the given user to differentiate the purchased products 23 from the fake products 25. In some embodiments, for example, the user device 30 may display both the purchased products 23 and the fake products 25 together on the display 31, and the prompt the given user to select the fake products. Alternatively, the prompt may be for the given user to select the purchased products 23. In some embodiments, an image or text of a product, either purchased 23 or fake 25 may be displayed on the display 31 of the user device 30 and the given user may be prompted to select whether the currently displayed product is purchased or fake. Of course, other and/or additional techniques for prompting the given user to differentiate the purchased products 23 from the fake products 25.

The account validation server 40 at Block 64, determines, based upon the user device 30, whether the given user has differentiated the purchased products 23 from the fake products 25. For example, the selections of either the purchased products 23 or fake products 25 may be communicated to the account validation server 40, and the account validation server may make the determination when all or a threshold number of purchased or fake items have been successfully identified. For example, where several images representing fake products 25 are displayed together with images representing purchased products 23, once all the displayed purchased or fake products are identified, the account validation server 40 may determine that the given user has differentiated the purchased products from the fake products. In some embodiments, selected images identified as either purchased or fake may be replaced with new images of either purchased or fake items until a threshold number of purchased or fake items has been correctly identified, for example.

Where products, either purchased 23 or fake 25 are displayed sequentially one at a time, the account validation server 40 may determine that the given user has differentiated the purchased products from the fake products when a threshold number of the displayed products have correctly been identified by the given user as either purchased or fake. Of course, other mechanisms for determining whether the given user has differentiated the purchased products 23 from the fake products 25 may be used.

If, at Block 64, when it has been determined that the given user has differentiated the purchased products from the fake products, the account validation server 40 validates the corresponding account 21 (Block 66) so that the user may use the account for online or e-commerce purchases (e.g., from a brick-and-mortar store). If, at Block 64, it is not determined, e.g., if it cannot be determined after a threshold number of attempts, operations end at Block 68. A notification may be communicated and displayed on the display 31 of the user device 30 indicating whether the validation was successful.

The present system 20 may be particularly advantageous for validating a loyalty account. In such embodiments, the account validation server 40 may store the order purchase history for each of a plurality of loyalty accounts, obtain a loyalty account identifier from the user device for the given user, and communicate the purchased products to the user device for display thereon based upon a corresponding loyalty account associated with the loyalty account identifier. In other words, the system 20 may be implemented to validate a loyalty account.

As will be appreciated by those skilled in the art, with growth in e-commerce, a retailer that typically operates brick-and-mortar stores, for example, grocery stores, may be desirous of establishing an e-commerce presence. Accordingly, it may be desirable for a retailer to have the ability to link a given user's in-store loyalty account with an online or e-commerce shopping experience. However, it is generally desirable to have the linking experience be relatively easy and involve a relatively little involvement from the given user, for example, a relatively small amount of information being provided by given user (e.g., a loyalty number). The account validation system 20 advantageously permits a given user to link a loyalty account 21 with a reduced set of information, for example, a loyalty number. The given user's loyalty account 21 may then be linked relatively easily based upon knowledge from the given user. However, the system 20 may validate other types of accounts, for example, validate a password accessed account at an online or brick and mortar retailer.

Figure 4A:
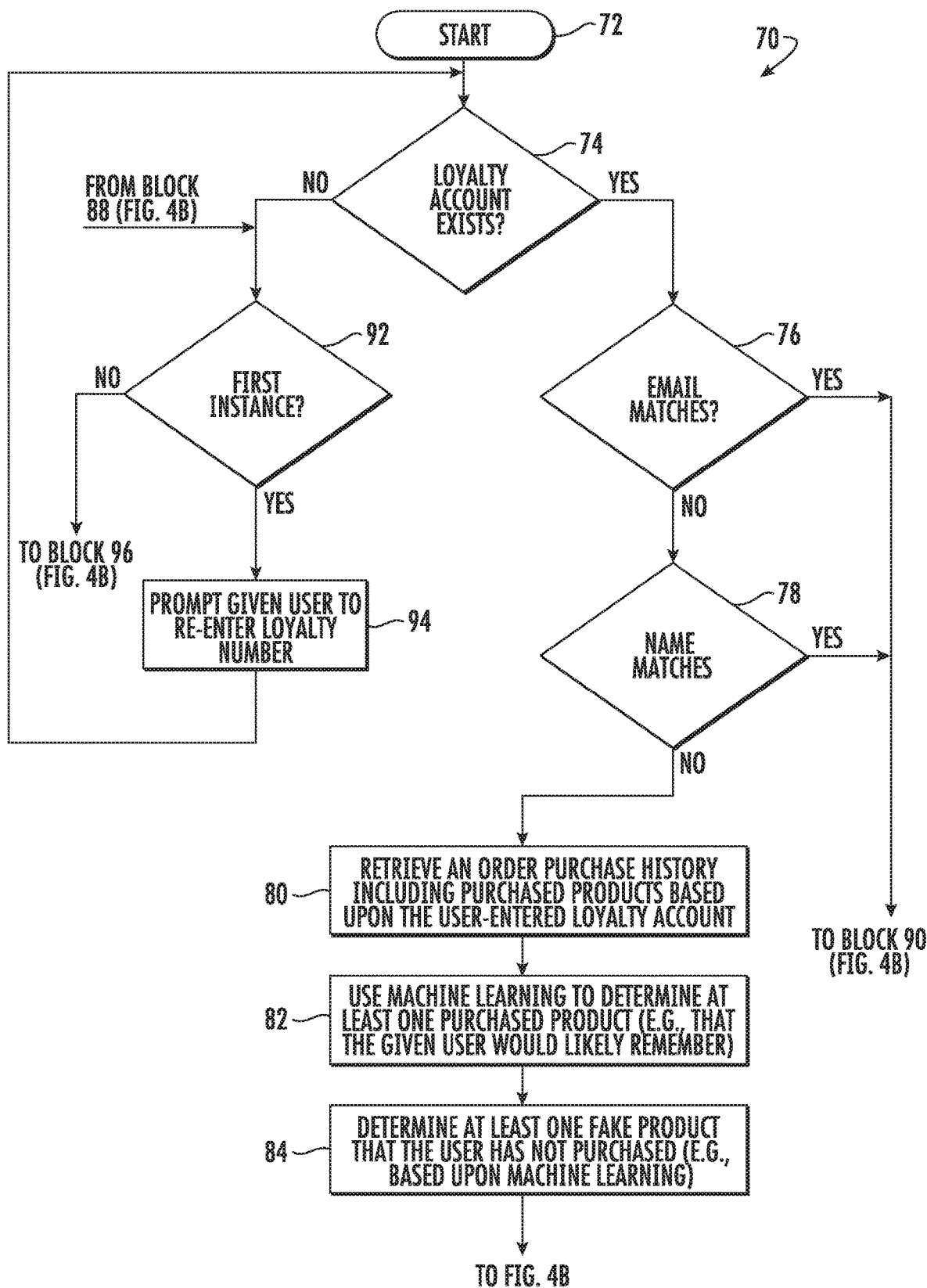
FIG. 4A is a flow chart of operations of a loyalty account validation system in accordance with an embodiment.
Figure 4B:
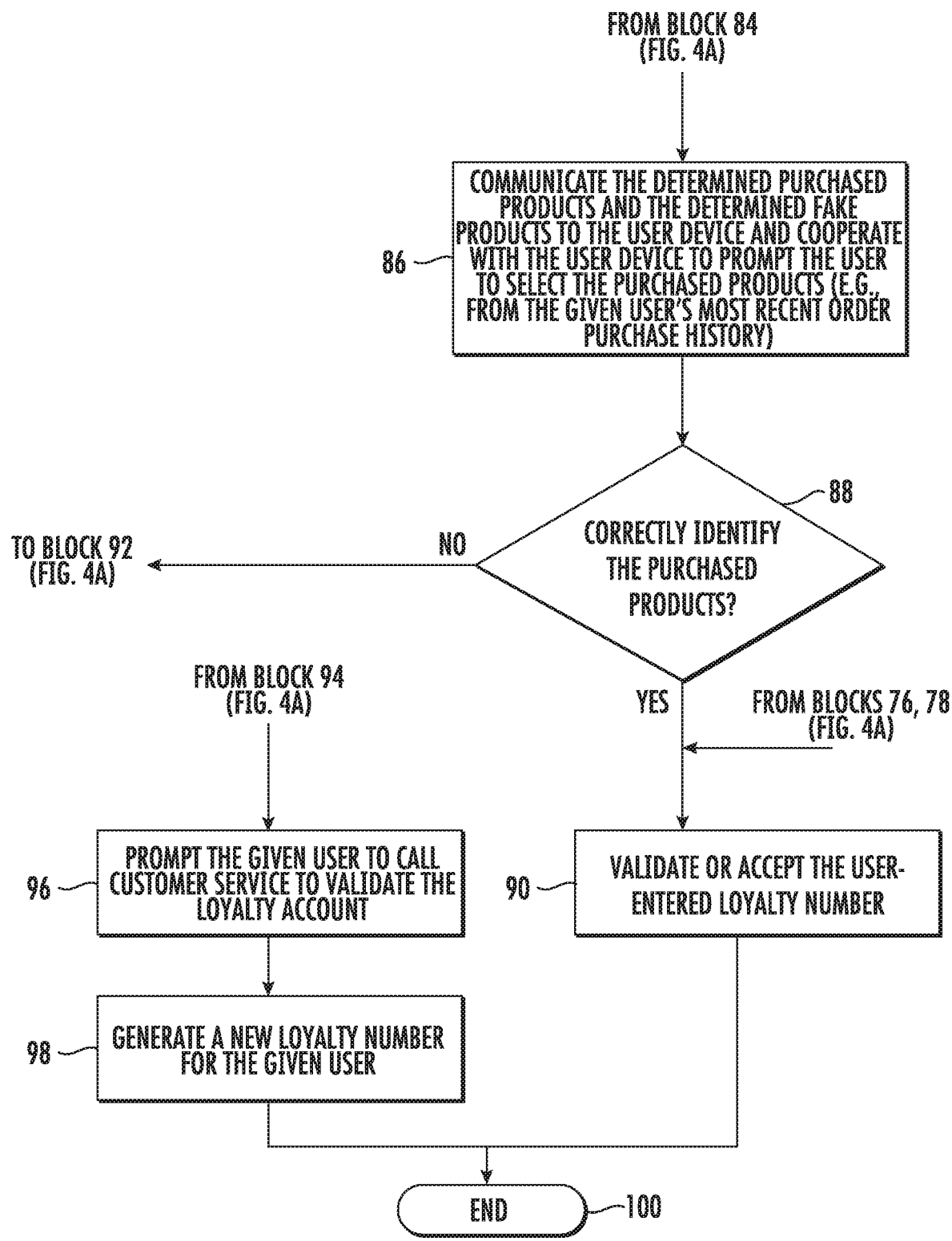
FIG. 4B is a flow chart of continued operations from the flow chart of FIG. 4A.

Referring now to the flowchart 70 in FIGS. 4A and 4B, a more detailed operation of the account validation system 20 with respect to a loyalty account will now be described with respect to the account validation server 40. Beginning at Block 72, after a given user creates an account, for example, at an e-commerce site (e.g., associated with the retailer) by entering their associated loyalty account number 24, name, and email address, the account validation server 40 determines whether an associated loyalty account 21 exists (Block 74). More particularly, the account validation server 40 determines that the loyalty account number 24 does exist for the retailer and has not already been linked (e.g., through a loyalty provider used by the retailer).

If the lookup fails or it is determined that the loyalty account number 24 does not exist at Block 74, the account validation server 40 determines whether the failed lookup is a first instance (Block 92). In other words, the loyalty account validation server 40 determines whether the failed lookup is the first failed lookup for the given loyalty account number 24. If at Block 92 it is determined that the failed lookup was the first instance of a failed lookup for the user-entered or given loyalty account number, the loyalty account validation server 40 cooperates with the user device 30 to prompt the given user to re-enter the loyalty number (Block 94) and operations return to Block 74. If at Block 92 it is determined that the failed instance was not the first instance (i.e., a subsequent or second), the loyalty account validation server 40 optionally cooperates with the user device 30 to generate notification, e.g., on the display 31 of the user device, that the given user should contact customer service associated with the retailer and/or loyalty account in order to validate or link the retailer loyalty account 21 to the online account created by the given user (Block 96). The account validation server 40 generates, at Block 98, a new (e.g., temporary) loyalty account number and communicates the new loyalty account number to the given user, e.g., via the user device 30, so that the given user could continue shopping on the e-commerce site. Operations end at Block 100.

Returning to Block 74, if the lookup is successful or it is determined that the loyalty account number exists, the account validation server 40 determines whether the user-entered email address (i.e., entered via the e-commerce site), matches an email address associated with the loyalty account 21 or loyalty account number (Block 76). If, at Block 76 it is determined that the user-entered email address does not match the email address associated with the loyalty account 21, then the account validation server 40 determines whether the user-entered name (i.e., entered via the e-commerce site), matches a name associated with the loyalty account or loyalty account number (Block 78). In some embodiments, steps 76 and 78 may be omitted.

If, at Block 76 or Block 78, it is determined that either of the user-entered email and name, respectively, matches the email and name associated with the loyalty account 21 or loyalty account number, the loyalty account validation server 40 validates the loyalty account (Block 90). In other words, the user-entered loyalty account obtained at Block 74 is accepted, and the retailer loyalty account associated with the user is linked to their newly created online account.

Operations end at Block 100. Of course, in some embodiments, the account validation server 40 may validate the corresponding loyalty account based upon matching either of the user-entered email address or user-entered name.

If at Block 78, the account validation server 40 determines that the user-entered name does not match the name associated with the user-entered loyalty account, the account validation server 40 retrieves, e.g., from the memory 42, an order purchase history 22 including purchased products 23 based upon the user-entered loyalty account (Block 80). As will be appreciated by those skilled in the art, purchased products 23 may be stored in the memory 42 on a per-item basis and in real time during a purchase transaction at a POS terminal at the retailer based upon the user-provided loyalty account number provided or entered at the POS terminal.

The account validation server 40, at Block 82, uses machine learning with order purchase history 22 or purchased products 23 being provided as input to the machine learning model to determine one or more purchased products that the given user would likely remember. The determination may be based upon brand, pricing, food-type, and/or dietary preferences of the given user learned based upon the order purchase history, for example, as described above. In some embodiments, the account validation server 40 may retrieve the most recent order or purchased products 23 from the order purchase history 22.

The account validation server 40, at Block 84, determines one or more fake products 25 or items that the user has not purchased. The account validation server 40 determines the fake products 25 based upon machine learning with order purchase history 22 or purchased products 23 being provided as input to the machine learning model to determine one or more products that the given user would likely identify as fake products or products not purchased before.

At Block 86, the account validation server 40 communicates the determined purchased products 23 and the determined fake products 25 to the user device 30 for display thereon, and cooperates with the user device to prompt the user (e.g., via an input device of the user device, such as, for example, a touch display), to select the products from the given user's most recent order purchase history 22. In some embodiments, the account validation server 40 may cooperate with the user device 30 to prompt the user to select the fake products 25. The display 31 of the purchased products 23 and various techniques for selecting or differentiating the purchased products from the fake products 25 are described above.

At Block 88, the account validation server 40 determines if the given user has correctly identified the purchased products 23 or differentiated the purchased products from the fake products 25. If the given user has correctly identified the purchased products 23 at Block 88, the account validation server 40 validates the loyalty account 21 (Block 90). If at Block 88, the given user has not correctly identified the purchased products 23 or failed to differentiate the purchased products from the fake products 25, the account validation server 40 determines whether the failed lookup is a first instance (Block 92). Operations end at Block 100.

A method aspect is directed to a method of validating an account 21. The method includes using an account validation server 40 to store an order purchase history 22 for each of a plurality of accounts 21. The order purchase history 22 includes at least one purchased product 23 and obtains an account identifier 24 from a user device 30 for a given user. The method also includes using the account validation server 40 to communicate the at least one purchased product 23 to the user device 30 for display thereon based upon a corresponding account 21 associated with the account identifier 24 and communicate at least one fake product 25 to the user device for display thereon and based upon the order purchase history 22 for the corresponding account. The method further includes using the account validation server 40 to cooperate with the user device 30 to prompt the given user to differentiate the at least one purchased product 23 from the at least one fake product 25 and determine, based upon the user device, whether the given user has differentiated the at least one purchased product from the at least one fake product, and when so, validate the corresponding account 21.

A computer readable medium aspect is directed to a non-transitory computer readable medium for validating an account 21. The non-transitory computer readable medium includes computer executable instruction for causing a processor 41 to perform operations. The operations include storing an order purchase history 22 for each of a plurality of accounts 21, wherein order purchase history includes at least one purchased product 23, and obtaining an account identifier 24 from the user device 30 for a given user. The operations also include communicating the at least one purchased product 23 to the user device 30 for display thereon based upon a corresponding account 21 associated with the account identifier 24 and communicating at least one fake product 25 to the user device for display thereon and based upon the order purchase history 22 for the corresponding account. The operations further include cooperating with the user device 30 to prompt the given user to differentiate the at least one purchased product 23 from the at least one fake product 25, and determining, based upon the user device, whether the given user has differentiated the at least one purchased product from the at least one fake product, and when so, validate the corresponding account 21.

While a loyalty account validation server 40 has been described, it should be appreciated that the functions of the account validation server described herein may be performed by one or more physical processors or servers which may or be physically or geographically separated. Moreover, the account validation server 40 may perform functions in addition to those described herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An account validation system comprising:
    a user device;
    a point-of-sale (POS) terminal configured to communicate products being purchased at a retail store on a per-item basis; and
    an account validation server configured to
        obtain and store, on an on-going per-item basis, an order purchase history for each of a plurality of accounts based upon purchase transactions at the POS terminal, the order purchase history comprising a plurality of purchased products each having a brand food-type, and nutritional value associated therewith,
        obtain an account identifier from the user device for a given user, determine whether an account exists for the given user based upon the account identifier, and when so
determine at least one selected purchased product from the plurality of purchased products based upon a machine learning algorithm and a corresponding account associated with the account identifier, the machine learning algorithm being trained to determine the at least one selected purchased product for the corresponding account based upon learning brand, food-type, and nutritional value preferences from the plurality of purchased products purchased at the POS terminal, and the machine learning algorithm being updated on a per-item basis as the plurality of purchased products are being purchased at the POS terminal,
communicate the at least one selected purchased product to the user device for display thereon,
apply the machine learning algorithm on the on-going per-item basis to generate at least one fake product as applied to the order purchase history for the corresponding account, the at least one fake product being inconsistent with the learned brand, food-type, and nutritional value preferences for the given user,
communicate the at least one fake product to the user device for display thereon,
cooperate with the user device to prompt the given user to differentiate the at least one selected purchased product from the at least one fake product, and
determine, based upon the user device, whether the given user has differentiated the at least one selected purchased product from the at least one fake product, and when so, validate the corresponding account,
otherwise when the account does not exist for the given user based upon the account identifier, generate a new account identifier for the given user.

2. The account validation system of claim 1 wherein the plurality of accounts comprises a plurality of loyalty accounts and the account identifier comprises a loyalty account identifier; and wherein the account validation server is configured to communicate the at least one selected purchased product to the user device for display thereon based upon a corresponding loyalty account associated with the loyalty account identifier.

3. The account validation system of claim 1 wherein each of the plurality of products has a price associated therewith; and wherein the account validation server is configured to apply the machine learning algorithm to determine the at least one selected purchased product for the corresponding account and the at least one fake product based upon learning price preferences.

4. The account validation system of claim 1 wherein the product type comprises a food-type; and wherein the account validation server is configured to apply the machine learning algorithm to determine the at least one selected purchased product for the corresponding account and the at least one fake product based upon learning food-type preferences.

5. The account validation system of claim 1 wherein the user device is configured to display images of the at least one selected purchased product and the at least one fake product.

6. The account validation system of claim 1 wherein the account validation server is configured to cooperate with the user device to prompt the given user to differentiate the at least one selected purchased product from the at least one fake product by prompting the given user to select the at least one selected purchased product.

7. The account validation system of claim 1 wherein the account validation server is configured to cooperate with the user device to prompt the given user to differentiate the at least one selected purchased product from the at least one fake product by prompting the given user to select the at least one fake product.

8. The account validation system of claim 1 wherein the account identifier comprises one of an account number, an email address, and a name of the given user.

9. The account validation system of claim 1 wherein the at least one fake product comprises a plurality of fake products.

10. An account validation server comprising:
a processor and a memory cooperating therewith and configured to
obtain and store, on an on-going per-item basis, an order purchase history for each of a plurality of accounts based upon purchase transaction at a point-of-sale (POS) terminal configured to communicate products being purchased at a retail store on a per-item basis, the order purchase history comprising a plurality of purchased products each having a brand, a food-type, and a nutritional value associated therewith,
obtain an account identifier from a user device for a given user,
determine whether an account exists for the given user based upon the account identifier, and when so
determine at least one selected purchased product from the plurality of purchased products based upon a machine learning algorithm and a corresponding account associated with the account identifier, the machine learning algorithm being trained to determine the at least one selected purchased product for the corresponding account based upon learning brand, food-type, and nutritional value preferences from the plurality of purchased products purchased at the POS terminal, and the machine learning algorithm being updated on a per-item basis as the plurality of purchased products are being purchased at the POS terminal,
communicate the at least one selected product to the user device for display thereon,
apply the machine learning algorithm on the on-going per-item basis to generate at least one fake product as applied to the order purchase history for the corresponding account, the at least one fake product being inconsistent with the learned brand, food-type, and nutritional value preferences for the given user,
communicate the at least one fake product to the user device for display thereon,
cooperate with the user device to prompt the given user to differentiate the at least one selected purchased product from the at least one fake product, and
determine, based upon the user device, whether the given user has differentiated the at least one selected purchased product from the at least one fake product, and when so, validate the corresponding account, otherwise when the account does not exist for the given user based upon the account identifier, generate a new account identifier for the given user.

11. The account validation server of claim 10 wherein the plurality of accounts comprises a plurality of loyalty accounts and the account identifier comprises a loyalty account identifier; and wherein the processor is configured to communicate the at least one selected purchased product to the user device for display thereon based upon a corresponding loyalty account associated with the loyalty account identifier.

12. The account validation server of claim 10 wherein each of the plurality of products has a price associated therewith; and wherein the processor is configured to apply the machine learning algorithm to determine the at least one selected purchased product for the corresponding account and the at least one fake product based upon learning price preferences.

13. The account validation server of claim 10 wherein the processor is configured to cooperate with the user device to prompt the given user to differentiate the at least one selected purchased product from the at least one fake product by one of prompting the given user to select the at least one selected purchased product and prompting the given user to select the at least one fake product.

14. A method of validating an account comprising:
using an account validation server to
obtain and store, on an on-going per-item basis, an order purchase history for each of a plurality of accounts based upon purchase transactions at a point-of-sale (POS) terminal configured to communicate products being purchased at a retail store on a per-item basis, the order purchase history comprising a plurality of purchased products each having a brand, a food-type, and a nutritional value associated therewith,
obtain an account identifier from a user device for a given user,
determine whether an account exists for the given user based upon the account identifier, and when so
determine at least one selected purchased product from the plurality of purchased products based upon a machine learning algorithm and a corresponding account associated with the account identifier, the machine learning algorithm being trained to determine the at least one selected purchased product for the corresponding account based upon learning brand, food-type, and nutritional value preferences from the plurality of purchased products purchased at the POS terminal, and the machine learning algorithm being updated on a per-item basis as the plurality of purchased products are being purchased at the POS terminal,
communicate the at least one selected purchased product to the user device for display thereon,
apply the machine learning algorithm on the on-going per-item basis to generate at least one fake product as applied to the order purchase history for the corresponding account, the at least one fake product being inconsistent with the learned brand, food-type, and nutritional value preferences for the given user,
communicate the at least one fake product to the user device for display thereon, cooperate with the user device to prompt the given user to differentiate the at least one selected purchased product from the at least one fake product, and
determine, based upon the user device, whether the given user has differentiated the at least one selected purchased product from the at least one fake product, and when so, validate the corresponding account,
otherwise when the account does not exist for the given user based upon the account identifier, generate a new account identifier for the given user.

15. The method of claim 14 wherein the plurality of accounts comprises a plurality of loyalty accounts and the account identifier comprises a loyalty account identifier; and wherein using the account validation server comprises using the account validation server to communicate the at least one selected purchased product to the user device for display thereon based upon a corresponding loyalty account associated with the loyalty account identifier.

16. The method of claim 14 wherein each of the plurality of products has a price associated therewith; and wherein using the account validation server comprises using the account validation server to apply the machine learning algorithm to determine the at least one selected purchased product for the corresponding account and the at least one fake product based upon learning price preferences.

17. The method of claim 14 wherein using the account validation server comprises using the account validation server to cooperate with the user device to prompt the given user to differentiate the at least one selected purchased product from the at least one fake product by one of prompting the given user to select the at least one selected purchased product and prompting the given user to select the at least one fake product.

18. A non-transitory computer readable medium for validating an account, the non-transitory computer readable medium comprising computer executable instruction for causing a processor to perform operations comprising:
obtaining and storing, on an on-going per-item basis, an order purchase history for each of a plurality of accounts based upon purchase transactions at a point-of-sale (POS) terminal configured to communicate products being purchased at a retail store on a per-item basis, the order purchase history comprising a plurality of products each having a brand, food-type, and nutritional value associated therewith;
obtaining an account identifier from a user device for a given user;
determining whether an account exists for the given user based upon the account identifier, and when so
determining at least one selected purchased product from the plurality of purchased products based upon a machine learning algorithm and a corresponding account associated with the account identifier, the machine learning algorithm being trained to determine the at least one selected purchased product for the corresponding account based upon learning brand, food-type, and nutritional value preferences from the plurality of purchased products as the plurality of purchased products are being purchased at the POS terminal,
communicating the at least one selected purchased product to the user device for display thereon,
applying the machine learning algorithm on the on-going per-item basis to generate at least one fake product as applied to the order purchase history for the corresponding account, the at least one fake product being inconsistent with the learned brand, food-type, and nutritional value preferences for the given user, communicating the at least one fake product to the user device for display thereon, cooperating with the user device to prompt the given user to differentiate the at least one selected purchased product from the at least one fake product, and determining, based upon the user device, whether the given user has differentiated the at least one selected purchased product from the at least one fake product, and when so, validate the corresponding account; otherwise when the account does not exist for the given user based upon the account identifier, generating a new account identifier for the given user.

19. The non-transitory computer readable medium of claim 18 wherein the plurality of accounts comprises a plurality of loyalty accounts and the account identifier comprises a loyalty account identifier; and wherein the operations comprise communicating the at least one selected purchased product to the user device for display thereon based upon a corresponding loyalty account associated with the loyalty account identifier.

20. The non-transitory computer readable medium of claim 18 wherein each of the plurality of products has a price associated therewith; and wherein the operations comprise applying the machine learning algorithm to determine the at least one selected purchased product for the corresponding account and the at least one fake product based upon learning price preferences.

21. The non-transitory computer readable medium of claim 18 wherein the operations comprise prompting the given user to differentiate the at least one selected purchased product from the at least one fake product by one of prompting the given user to select the at least one selected purchased product and prompting the given user to select the at least one fake product.

\* \* \* \* \*